June 17, 1930.  W. E. HOLLAND  1,765,271
BATTERY SEPARATOR
Filed Oct. 17, 1922  2 Sheets-Sheet 1
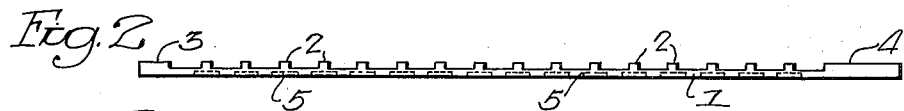
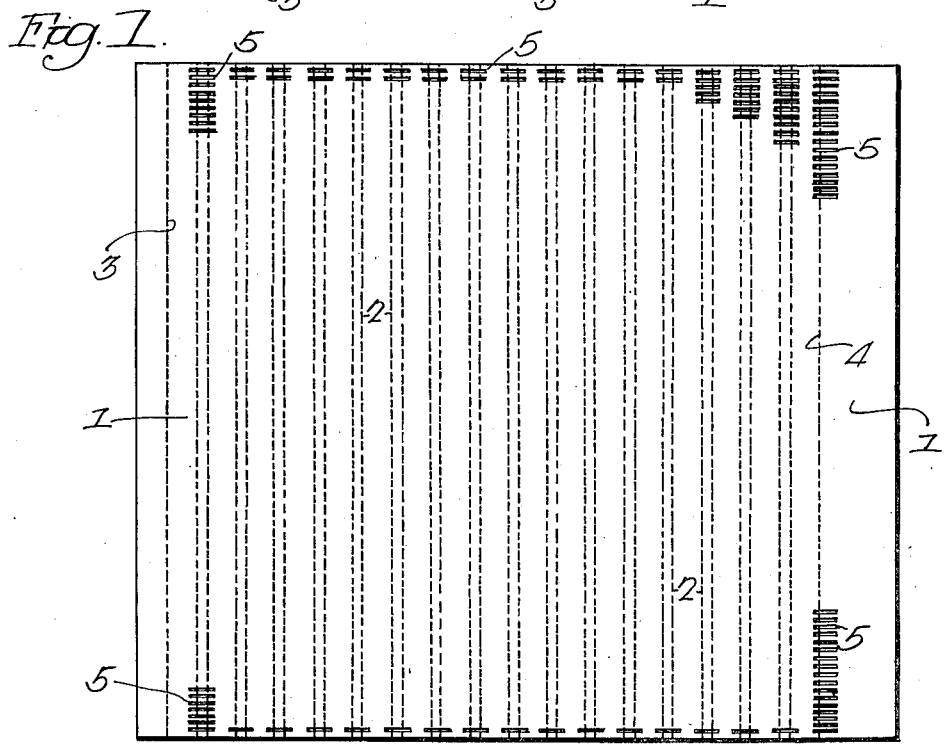
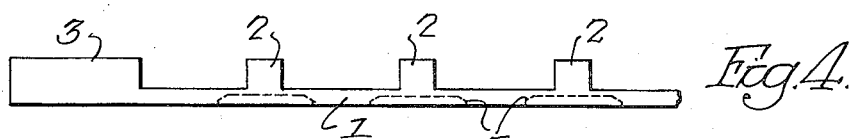
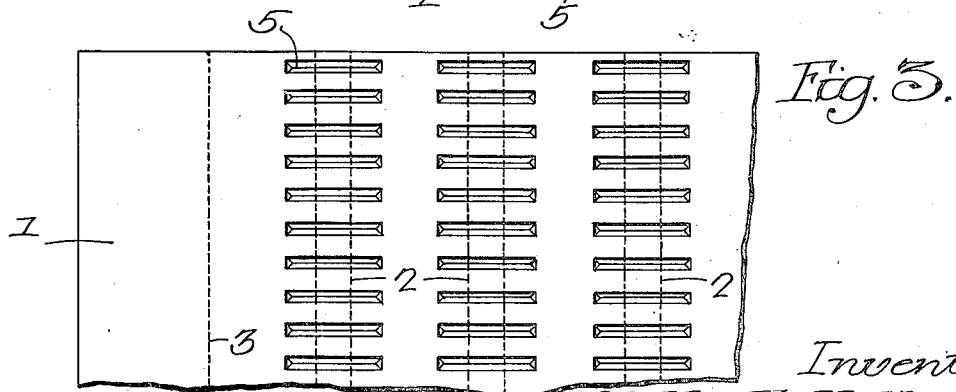
Inventor.
Walter E. Holland.
by his Attorneys
Howson & Howson June 17, 1930.  W. E. HOLLAND  1,765,271

BATTERY SEPARATOR

Filed Oct. 17, 1922  2 Sheets-Sheet 2

Inventor.—
Walter E. Holland.
by his Attorneys.
Howson & Howson

Patented June 17, 1930

1,765,271

UNITED STATES PATENT OFFICE

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

BATTERY SEPARATOR

Application filed October 17, 1922. Serial No. 595,056.

One object of my invention is to provide a separator of wood or equivalent material especially adapted for use between the plates of electric batteries, which, while effectually performing its usual functions and particularly that of preventing passage through its body of active material, will quickly allow passage through it of battery electrolyte and thus permit putting of a battery in service in a minimum of time after it has been filled.

Another object of my invention is to provide a novel form of diaphragm separator offering reduced resistance to the passage of electric current when immersed in an electrolyte and capable of being satisfactorily used in certain types of batteries without any previous porosity-giving treatment.

Another object is to provide a novel method of preparing wood or equivalent material in such manner as to facilitate and shorten the time required for its treatment by washing, boiling, or chemical processes in order to increase its porosity or free it of objectionable materials preparatory to its being put in service in a battery.

A further object is to provide a novel form of ribbed separator of increased permeability to liquids, the invention contemplating especially the formation of recesses or indentations, usually in the unribbed face of the separator plate, in such positions as to allow the better diffusion of liquids to the interior of the thicker portions of the separator plate.

These objects and other advantageous ends I attain as hereinafter set forth, reference being had to the accompanying drawings, in which, Figs. 1 and 2 are respectively a side elevation, to some extent diagrammatic, illustrating one form of battery separator embodying my invention;

Figs. 3 and 4 are respectively a fragmentary elevation and a plan on an enlarged scale, further illustrating the construction of the separator shown in Figs. 1 and 2;

In the above drawings, 1 represents a sheet or plate of any suitable wood such as Douglas fir, cypress, white or Port Orford cedar, pine or any other wood or material suitable for use as a battery separator either with or without preparatory washing, chemical, or other treatment. This plate may be of uniform thickness throughout, as indicated at $1^a$ in Fig. 8, or it may be formed with parallel ribs 2 either with or without thickened marginal portions 3 and 4.

In accordance with my invention this sheet or plate is cut or indented, by any suitable means such as a rotary roller, whereby one of its faces is formed with indentations or cuts 5, $5^a$, extending part way through it. In that form of my invention shown in Figs. 1 to 4 inclusive, these cuts are in the form of elongated slits arranged in parallel rows in those portions of the separator plate immediately to the rear of the ribs 2—2, so that it is obvious that either when subjected to a washing or chemical treatment or, when immersed in battery electrolyte, the liquid easily and quickly penetrates to the interior of the wood structure.

Figure 7:
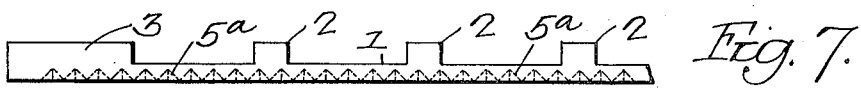
Figs. 6 and 7 are respectively a fragmentary side elevation and a plan of that form of the invention shown in Fig 5.

Obviously the form of the cuts or indentations may be widely varied without departing from my invention and they may be formed not only adjacent the ribs but at other portions of the separator plate and in any desired arrangement. Thus in Figs. 5 to 7 inclusive I have shown a separator plate in which the indentations are tapering in form as indicated at $5^a$, being made by a die having pyramidal points projecting therefrom. I prefer to form the indentations in the unribbed face of the separator, although, if desired, they may be formed in the ribbed face or in both faces.

Figure 8:
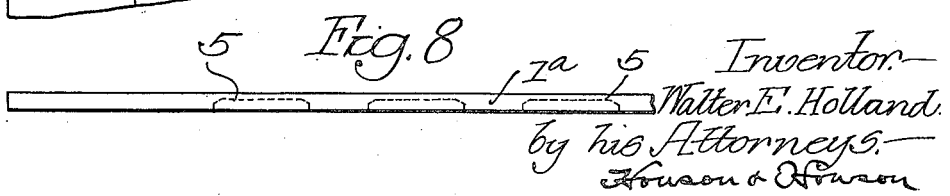
Fig. 8 is a fragmentary plan of a third form of my invention.

In the separator $1^a$ shown in Fig. 8 the ribs are omitted and at suitable intervals it is provided with cuts or indentations 5 extending longitudinally across the grain of the wood. The indentations may be arranged in parallel series, as shown in Figs.

Figure 5:
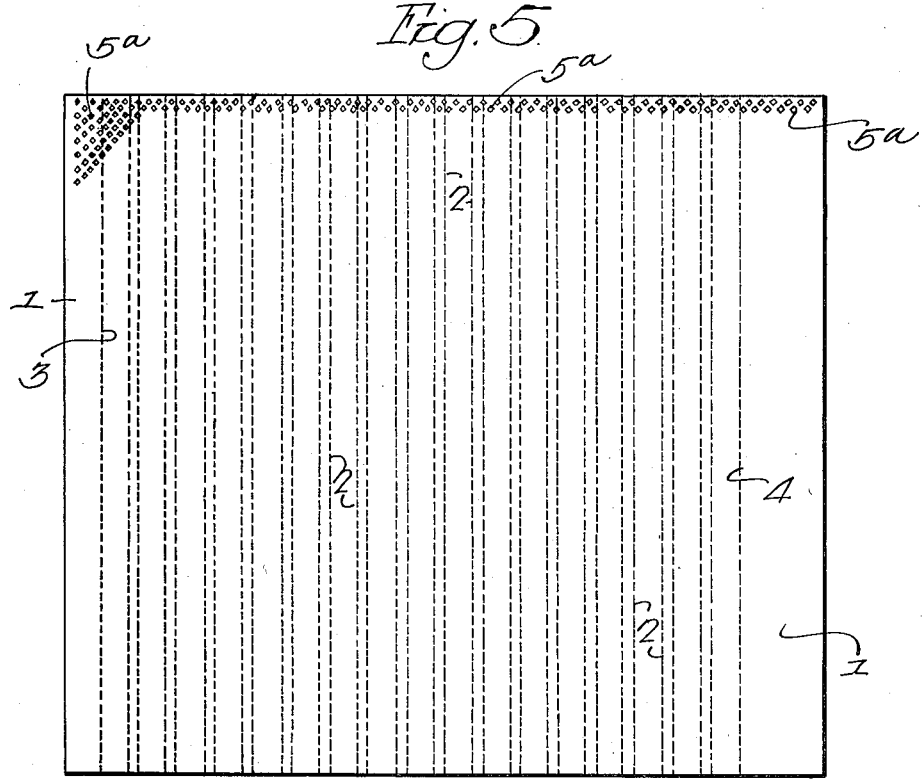
Fig. 5 is a side elevation of a modified form of separator.
Figure 6:
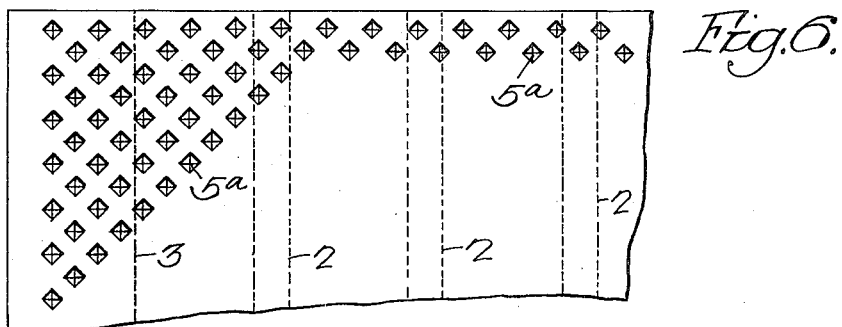

1 to 4 inclusive, or they may be in any other pattern, as for example in a staggered arrangement similar to that shown in Figs. 5 and 6. When indentations in the form of elongated cuts are used, the length of the cuts should extend in lines other than parallel with the grain of the wood to be most effective for the purpose intended and less likely to weaken the separator.

It is to be understood that in the preferred form of my invention the fibres of the wood or other material constituting the separator are merely cut and pushed aside without the removal of any of the separator material, so that the structure as a whole is not objectionably weakened and even though indented all the way through its thickness, the wetting of the wood when used in a battery will cause the indentations to close partly or wholly, so that the active material of the battery plates cannot pass through.

The indentations or recesses formed as described permit the comparatively rapid saturation or impregnation of the separator by any liquid in which it is immersed and materially reduce its resistance to the passage of electric current under conditions of operation in a storage or other battery. Due to the aforesaid qualities, a separator made in accordance with my invention may be successfully used in certain types of batteries without any previous boiling or chemical treatment. If required, however, this separator may be given any of the usual porosity-giving treatments, such as a boil in water or weak caustic soda solution, before use. When given such a treatment, the separator may either be kept wet as is usually done until placed in the battery, or it may be dried preferably under such conditions as will prevent warping.

I claim:

1. A battery separator of porous material having impressed fibre-rupturing indentations over at least one face.

2. A battery separator consisting of a ribbed plate of wood having impressed fibre-rupturing indentations in its unribbed face.

3. A battery separator consisting of a ribbed plate of porous material having series of impressed fibre-rupturing indentations in its unribbed face along the lines of said ribs.

4. A battery separator consisting of a plate of wood having elongated parallel impressed indentations therein, said indentations extending part way through said separator and rupturing the fibres of the wood.

5. A battery separator consisting of a plate of wood having elongated parallel impressed fibre-rupturing indentations therein, with ribs projecting from the face of the plate opposite that having said indentations.

6. A battery separator consisting of a plate of wood having rows of elongated parallel impressed indentations formed in at least one face thereof, said indentations cutting across the grain of the wood to rupture the fibres thereof and being formed without removal of material.

7. A battery separator of wood formed with impressed fibre-rupturing indentations, and of greater porosity than when in its natural state.

8. A battery separator of wood formed with impressed fibre-rupturing indentations, and having an increased porosity characteristic of a wet treatment and subsequent drying.

9. A battery separator consisting of wood having impressed fibre-rupturing indentations therein and free of those ingredients removed by treatment with boiling liquid.

10. A battery separator consisting of wood formed with impressed fibre-rupturing indentations and free of those constituents removable by caustic soda solution.

WALTER E. HOLLAND.